United States Patent [19]
Isshiki et al.

[11] Patent Number: 5,643,686
[45] Date of Patent: Jul. 1, 1997

[54] MAGNETIC RECORDING MEDIUM AND METHOD FOR MANUFACTURING THE SAME

[75] Inventors: Teiichi Isshiki; Masayuki Hatano; Junichi Hashimoto; Tomoaki Karino; Yoshifumi Kanda, all of Tokyo, Japan

[73] Assignee: Tokyo Magnetic Printing Co., Ltd., Tokyo, Japan

[21] Appl. No.: 356,431

[22] Filed: Dec. 15, 1994

[30] Foreign Application Priority Data

| Jan. 6, 1994 | [JP] | Japan | 6-011319 |
| Aug. 11, 1994 | [JP] | Japan | 6-209329 |
| Oct. 13, 1994 | [JP] | Japan | 6-273144 |

[51] Int. Cl.$^6$ ................................ G11B 5/716
[52] U.S. Cl. .................. 428/694 BM; 427/128; 427/130; 427/548; 428/900; 360/134
[58] Field of Search ............ 428/694 BM, 900; 427/128, 130, 548; 360/134

[56] References Cited

U.S. PATENT DOCUMENTS

| 4,239,959 | 12/1980 | Gutterman | 235/493 |
| 4,242,400 | 12/1980 | Smith et al. | 428/201 |
| 4,244,998 | 1/1981 | Smith | 428/195 |
| 4,743,490 | 5/1988 | Fayling | 428/212 |
| 4,977,040 | 12/1990 | Yano et al. | 428/692 |
| 4,982,302 | 1/1991 | Kitamoto et al. | 360/134 |
| 5,264,292 | 11/1993 | Kovacs et al. | 428/548 |

FOREIGN PATENT DOCUMENTS

| 0428779 | 5/1991 | European Pat. Off. . |
| 03244598 | 10/1991 | Japan . |
| 05318974 | 12/1993 | Japan . |

*Primary Examiner*—Stevan A. Resan
*Attorney, Agent, or Firm*—Seidel, Gonda, Lavorgna & Monaco, P.C.

[57] ABSTRACT

A fixed permanent pattern is used for identifying a magnetic recording medium and a high security against forgery or modification is obtained by a magnetic recording medium including a non-magnetic support and at least two magnetic layers formed on said support, characterized in that at least one of said at least two magnetic layers contains magnetic particles having a coercive force of 4,000 Oe or less dispersed in a binder and has a non-rewritable fixed signal which has been recorded by magnetic field generated by a signal recorded on one or more other magnetic layers under the influence of an orientation magnetic field.

20 Claims, 9 Drawing Sheets

MAGNETIC RECORDING MEDIUM AND METHOD FOR MANUFACTURING THE SAME

BACKGROUND OF THE INVENTION

1. Technical field

The present invention relates to a magnetic recording medium, and more particularly to a magnetic recording medium useful for a magnetic card or the like used in settlement of accounts in bankings, circulations, transportations, or telecommunications. Also, the present invention provides a process for producing such magnetic recording medium.

2. Prior art

In recent years, magnetic recording media such as magnetic cards have been widely adopted as means for settlement of accounts in the fields of bankings, circulations, transportations or telecommunications. However, the magnetic cards are exposed to risks of illegal or unauthorized uses such as forgery or modification. Accordingly, magnetic recording media having high confidentiality are required, especially with machines for settlement of accounts.

As means for enhancing the confidentiality of magnetic recording medium, it was proposed to write a fixed or permanent signal for identifying the magnetic recording medium, which is difficult to rewrite, on an area different from the area for ordinary signal recording-reproduction.

More particularly, Japanese Patent Kokoku No. 49-37529 (1974) proposed to provide a fixed identifying pattern by varying alternately the direction of the axis of easy magnetization of acicular magnetic particles in the magnetic layer with respect to the direction of reading; Japanese Patent Kokai No. 50-79311 (1975) proposed to provide a fixed identifying pattern by applying a magnetic coating on an ordinary magnetic layer on which an identifying information has been recorded, so that magnetic particles dispersed in the magnetic coating are oriented under the influence of the magnetic field from the recorded information and the directions of the orientation of them are physically fixed; and Japanese Patent Kokai No. 5-318974 (1993) proposed to provide an identification pattern on a magnetic layer containing magnetic particles having a coercive force of more than 4,500 Oe dispersed in a binder, by magnetically transferring an identification information recorded on an ordinary magnetic recording medium to another magnetic layer coated on the ordinary magnetic recording medium by the magnetic field from the recorded identification information. It is difficult to modify these identification patterns if ordinary magnetic recording and reproducing head are used.

However, the method of providing a fixed identifying pattern by varying alternately the direction of the axis of easy magnetization of acicular magnetic particles in the magnetic layer with respect to the direction of reading disclosed in Japanese Patent Kokoku No.49-37529 not only necessitates a special orientation apparatus in producing the magnetic recording medium, thereby increasing the cost for production and machinery cost.

On the other hand, with respect to the method of providing a fixed identifying pattern by applying a magnetic coating on an ordinary magnetic layer on which an identifying information has been recorded so as to transfer the recorded information from the ordinary magnetic recording layer to the magnetic coating, the method disclosed in Japanese Patent Kokai No. 50-79311 has a drawback that the output from the identification pattern is low.

This drawback has been unexpectedly overcome according to the present invention which uses magnetic orientation which, however, is considered to exert an adverse effect on the magnetic transfer system disclosed in this reference.

Further, the magnetic transfer method disclosed in Japanese Patent Kokai No.5-318974 has a deficiency in that there is a high risk of modification or forging of the magnetic recording medium because it is well know in the art that if a magnetic recording and reproducing head utilizing a magnetic core having saturation magnetization of 22 kilo gauss or more is used it is quite possible to rewrite information on a magnetic recording medium having a high coercive force up to about 8,000 Oe. Moreover, in the magnetic recording medium of this reference, the magnetic layer of a higher coercive force than the ordinary magnetic layer of lower coercive force is on the side closer to the magnetic head and accordingly is exposed to a stronger magnetic field. Accordingly, there is a high risk of modification or forging as it is relatively easy to rewrite the identification information inherent to the magnetic recording medium. With this system, it is not only difficult to transfer the identification information signal to the magnetic layer containing magnetic particles having a coercive force of 4,500 Oe or more due to this high coercive force but also difficult to read the recorded information due to the low saturation magnetization.

The present inventors have found that this problem is overcome by using magnetic particles having a relatively low coercive force.

OBJECT OF THE INVENTION

Accordingly, a principal object of the present invention is to overcome these difficulties by providing a magnetic recording medium having a non-rewritable fixed permanent pattern and a method for producing such magnetic recording medium.

If this fixed permanent pattern is used for identification information for identifying magnetic recording medium, a magnetic recording medium of a high security against forgery or modification can be provided because it is impossible to rewrite the information by means of any handling systems for magnetic recording media and only means of erasure is to destruct the medium.

Moreover, the fixed non-rewritable pattern is easily imparted to the magnetic recording medium at a low cost unlike fixed patterns provided by printing methods such magnetic bar code pattern or optical code pattern, because any special materials or complicated processes are not particularly required in the present invention.

SUMMARY OF THE INVENTION

The above problems have been overcome according to the present invention by a magnetic recording medium including a non-magnetic support and at least two magnetic layers formed on said support, characterized in that at least one of said at least two magnetic layers contains magnetic particles having a coercive force of 4,000 Oe or less dispersed in a binder and has a non-rewritable fixed signal which has been recorded by the magnetic field generated by a signal recorded on one or more other magnetic layers under the influence of an orientation magnetic field.

The non-rewritable fixed signal is an information to identify the magnetic recording medium. Such a signal is formed as a pattern composed of specific areas and other areas adjacent to said specific areas in such manner that the specific areas have a different magnetic output per unit area from the adjacent other areas.

Such specific areas and other areas may be formed by assigning different numbers of magnetic particles per unit volume( namely, concentration) to these areas.

The present invention further provides a method for producing a magnetic recording medium of this character, including a non-magnetic support and at least two magnetic layers formed on said support. This method comprises forming a first magnetic layer on said non-magnetic support, magnetically recording a specific signal on said first magnetic layer, applying a magnetic coating on a surface of said first magnetic layer to form a second magnetic layer which contains magnetic particles having a coercive force of 4,000 Oe or less dispersed in a binder, and applying a DC or AC magnetic orientation field to said magnetic coating, simultaneously with the application of the magnetic coating and/or prior to completion of drying and solidification of said magnetic coating.

After drying and solidification, the magnetic coating forms the second magnetic layer which has a non-rewritable fixed or permanent signal or pattern which has been recorded by the magnetic field generated by a signal recorded on said first magnetic layer and under the influence of said magnetic orientation field.

DETAILED EXPLANATION OF THE INVENTION

In a preferred method, a DC magnetic orientation field is used to provide an improved property over an AC magnetic orientation field, although the latter, too, is superior to the conventional methods. As is experienced with a DC orientation device which uses a pair of permanent magnets with their pole pieces of the same polarity facing each other, a reversing magnetic field is applied to the magnetic coating in a fluid condition during the period of travelling of the magnetic coating through the magnetic orientation field. It has been found that this type of DC magnetic orientation field is sufficiently effective but still inferior to DC magnetic orientation field provided by a DC solenoid coil or a magnetic head type orientation device which will be discussed later. The term "DC magnetic orientation field" means a static magnetic orientation field. For example, a magnetic field generated by passing a direct current through a solenoid coil or a magnetic field from a permanent magnet is DC magnetic field. Similarly, "AC magnetic orientation field" means an alternate magnetic orientation filed generated by passing an alternate current through a solenoid or a coil would on a magnetic yoke core.

The magnetic orientation field applied to the magnetic coating for the second magnetic layer is preferably substantially uniform along the surface of the first magnetic layer. This type of magnetic field is provided by the DC solenoid or magnetic head type orientation device.

It is preferred to apply the magnetic orientation field simultaneously with the application of the coating for the second magnetic recording layer although magnetic orientation field may be applied after the application of the magnetic coating but during or prior to completion of drying and solidification of the magnetic coating. More preferred is to use a first magnetic orientation field simultaneously with application of the magnetic coating and a second magnetic orientation field prior to completion of drying of the magnetic coating.

The present invention will now be explained with reference to the accompanying drawings.

BRIEF EXPLANATION OF THE DRAWINGS

FIGS. 2A, 2B, and 2C are schematic cross sectional views explaining the principle of the present invention in which FIG. 2A shows the first magnetic layer and the magnetization pattern recorded in the first magnetic layer, FIG. 2B shows the second magnetic layer formed on the first magnetic layer and the magnetization pattern from the first magnetic layer and from an magnetic orientation field, and FIG. 2C is a cross sectional view of the resulting magnetic recording medium, showing the magnetization of the first and second magnetic layers;

The present invention will now be explained in detail by making reference to the accompanying drawings.

Figure 1:
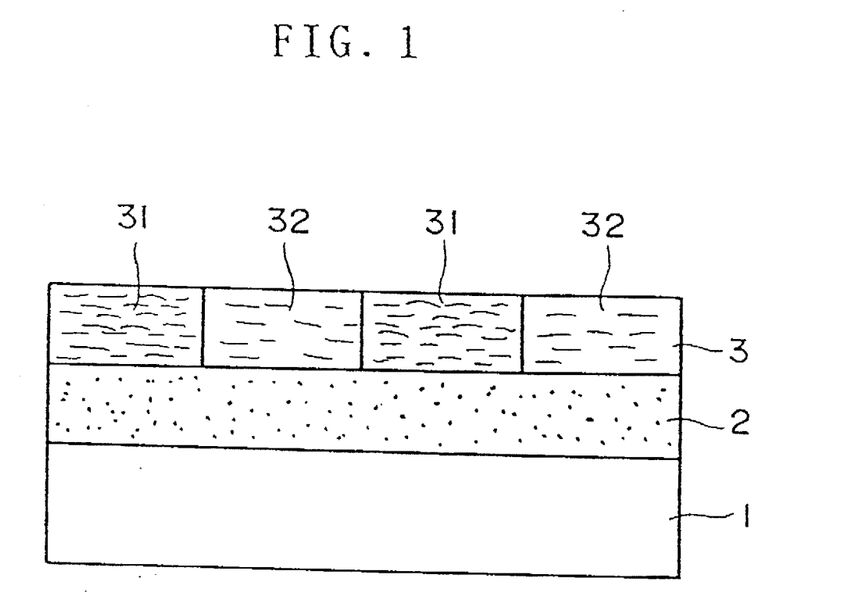
FIG. 1 is a schematic cross sectional view of a magnetic recording medium according to one embodiment of the present invention.

FIG. 1 schematically shows a cross sectional view of a magnetic recording medium according to an embodiment of the present invention which comprises a support or base 1 made of a non-magnetic material, a first magnetic layer 2 and a second magnetic layer 3, layered in this order. The second magnetic layer 3 is formed from a magnetic coating containing magnetic particles having a coercive force of 4,000 Oe or less dispersed in a high polymer resin binder. The second magnetic layer 3 has a non-rewritable fixed or permanent pattern consisting of alternate areas 31 of a high concentration of magnetic particles and accordingly of a high output per unit area and areas 32 of a low concentration of magnetic particles and accordingly of a low output per unit area with predetermined intervals.

The support 1 is made of any material conventionally used for magnetic cards, magnetic tapes and magnetic sheets such as polyethyleneterephthalate(PET), hard polyvinyl chloride, polypropylene and paper.

The first magnetic layer 2 may be the same as any of the conventional magnetic recording layers or films used for magnetic cards or magnetic recording tapes. For example, the first magnetic layer 1 may be prepared by applying a first magnetic coating composition formed by dispersing a magnetic powder selected from the any known magnetic materials such as $\gamma$-$Fe_2O_3$, cobalt-deposited $\gamma$-$Fe_2O_3$, barium ferrite, samarium ferrite in an organic polymer binder onto a non-magnetic support with a uniform dry thickness of about 4–20 μm according to any one of the conventional methods. It is preferable that the magnetic material used for the first magnetic layer 2 has a coercive force of at least 600 Oe because this layer must have a coercive force greater than the magnetic orientation field which is to be applied in the course of forming the second magnetic coating.

On the first magnetic layer 2, a second magnetic layer 3 is formed by applying and drying a magnetic coating comprised of a magnetic powder having a coercive force of 4,000 Oe or less dispersed in a polymer binder. It is a requirement that the first magnetic layer has a recorded information as a predetermined pattern at a predetermined area. This pattern represents an identification information for identifying the magnetic recording medium such as the number for specifying the medium. For example, this pattern is formed by means of an ordinary magnetic head and a medium driving means in such manner that the remnant magnetization is alternately reversed at given intervals in the direction of running of the magnetic recording medium. The identification information is coded using any known coding system such as RZ, PWM, FM, PM, MFM.

Figure 2A:
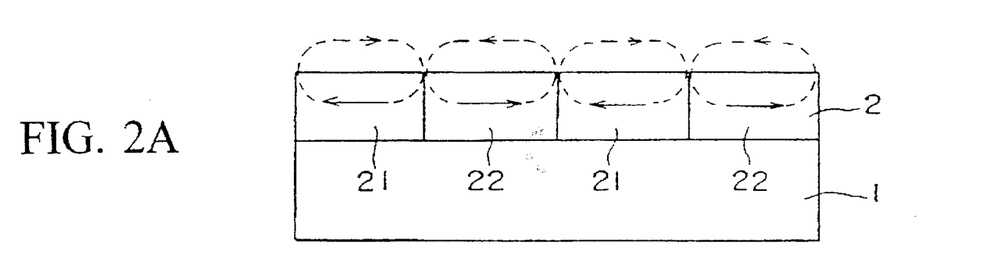
Figure 2B:
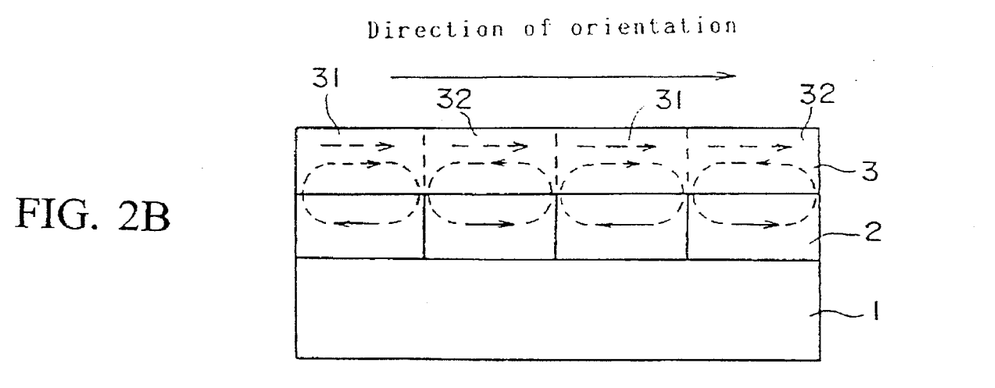
Figure 2C:
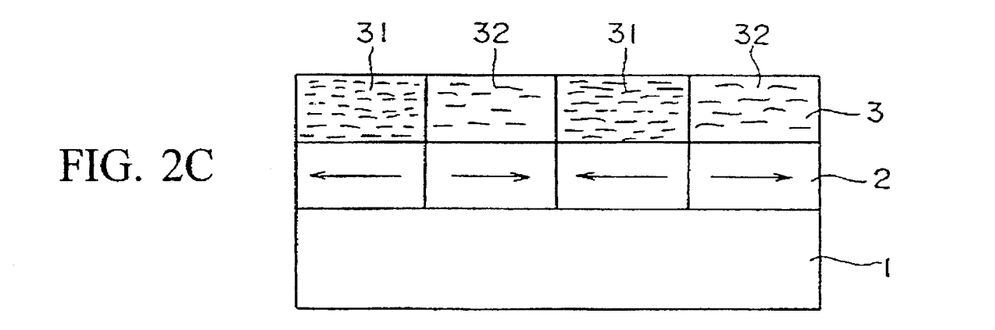
Figure 3:
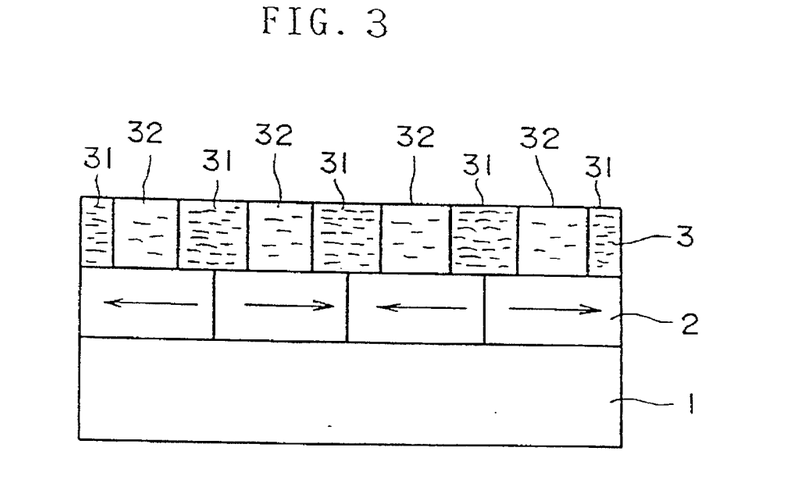
FIG. 3 is a cross sectional view of a magnetic recording medium according to another embodiment of the present invention.

FIGS. 2A–2C schematically illustrate a method of manufacturing the magnetic recording medium according to the present invention. FIG. 2A represents the state prior to application of the second magnetic layer 3. As seen, the first magnetic layer 2 has a signal consisting of areas 21 and 22 of respective predetermined lengths with alternately reversed polarities of magnetization. This signal is used for making a signal for identification in the second magnetic layer 3. Alternatively, the first magnetic layer 2 may be first demagnetized by applying an AC demagnetization field to zero remnant magnetization and then a single polarity may recorded only in the selected areas.

Then, a second magnetic coating for the second magnetic recording layer is applied uniformly on the thusly formed and recorded first magnetic layer. The second magnetic coating is exposed to a magnetic orientation field of predetermined strength and direction simultaneously with the application of the coating and/or after the coating and/or during the drying of the magnetic coating. The drying leads to solidification of the magnetic coating into the second magnetic layer. FIG. 2B schematically shows the magnetic field applied to the second magnetic layer 3 when the magnetic orientation filed is being applied. In the areas shown by reference numeral 31, since the direction of the signal field from the first magnetic layer 2 coincides with the direction of the magnetic orientation field( in the right direction in the case of FIG. 2B, the total magnetic field is strengthened in the areas 31, while in the areas shown by reference numeral 32, since the direction of the signal field from the first magnetic layer 2 is opposite to the direction of the magnetic orientation field, the total magnetic field is offset or weakened in the areas 32. In other words, the areas 31 of strong magnetic field and areas 32 of weak magnetic field are alternately formed in the second magnetic layer 3 according to the pattern signal recorded in the first magnetic layer 2. In general, as magnetic particles in a state of suspension in a fluid binder tends to be attracted to and concentrated in the areas of stronger magnetic field, the magnetic particles in the second magnetic coating are concentrated in the areas 31 to which a strong magnetic field is applied as shown in FIG. 2C. The second magnetic layer is then solidified by drying and/or curing according to any conventional method. As a result, the second magnetic layer 3 comprises alternately areas 31 which have a high content of magnetic particles and accordingly have a high magnetic output per unit area, and the areas 32 which have a low content of magnetic particles and accordingly have a low magnetic output per unit area. Thus, the identification signal recorded in the first magnetic layer 2 which is specific to the magnetic recording medium is reproduced in the second magnetic layer as a coded pattern in the form of difference in the magnetic output per unit area.

Incidentally, it should be noted that the lower the viscosity of the second magnetic coating and the higher the fluidity of the magnetic particles in the magnetic coating, the greater is the effect of concentration of the magnetic particles.

Further, as the magnetic orientation field to be applied to the second magnetic layer prior to its complete drying, a DC or AC magnetic orientation field may be used. Although both of them are effective for locally concentrating magnetic particles, it has been found that DC magnetic field is more effective. DC magnetic orientation field from a solenoid coil is the most preferred because it has a remarkable effect because of the fact that the direction of the magnetic orientation field remains unidirectional as the second magnetic coating passes through the solenoid coil. It is known that a pair of permanent magnets arranged face to face with the same polarity is often used for magnetic orientation but the magnetic field changes its polarity as the second magnetic coating passes through the space between the opposed pole pieces of the permanent magnets and it has been found that the effectiveness is inferior to the use of the DC solenoid coil. When an AC magnetic orientation field is used, the magnetic particles are localized in the portions where the magnetization of the signal recorded on the first magnetic layer 2 is reversed in direction. The strength of the magnetic orientation field is selected at a value more than 2.5 times the coercive force of the second magnetic layer in the fluid condition but less than the coercive force of the first magnetic layer 2 so as to prevent the recorded signal from being erased.

Further, the magnetic particles which have been locally concentrated tend to become randomly dispersed after they leave the orientation device because the magnetic binding force between the particles are weakened. Accordingly, it is desirable to apply a second magnetic orientation field to enhance the effect. It should be noted that the second magnetic orientation field less than several hundred oersted is sufficient for maintaining the concentrated condition.

As described in the forgoing, the identification signal pattern is formed chiefly by the magnetic field from the signal recorded on the first magnetic layer 2, the pattern can be formed in the same recording density as that of the first magnetic layer. For instance, identification code formed by the conventional watermark required a length of about 0.4 mm per one bit in the direction of reading, while the magnetic recording medium according to the present invention requires only about 0.06 mm or less for a length of each area of different magnetic output per unit area. As for the maximum length of each area having higher magnetic output per unit area, the length is preferably within 1 mm as measured in the direction of reading, because the effect of the magnetic field strength from the first magnetic layer 2 on the second magnetic layer 3 is weak if the intervals of reversal of magnetization are excessively large.

The magnetic powder used for preparing the second magnetic layer 3 may be selected from any materials if they can be magnetized by the magnetic field generated from the signal recorded in the first magnetic layer 2. Such magnetic material includes a flaked metal powder of high permeability such as permalloy, Sendust and amorphous alloy, a magnetically soft metal such as iron powder, Mn—Fe ferrite and Ni—Zn ferrite. Also, $\gamma$-$Fe_2O_3$, magnetite, cobalt deposited $\gamma$-$Fe_2O_3$, barium ferrite and other magnetic materials conventionally used for magnetic recording may be used because they can be fluidized and concentrated in a magnetic coating composition under the influence of the magnetic field from the signal recorded on the first magneti layer and the magnetic orientation field if the strength of the magnetic orientation field is appropriately selected. The coercive force in the state of fluid magnetic coating is generally significantly low compared with that of the dried magnetic coating, although it partly depends on the shapes of the magnetic particles. Accordingly, it is not necessary for the second magnetic layer to have a lower coercive force than that of the first magnetic layer after drying or solidification of the second magnetic layer. However, it is noted that the upper limit of the coercive force of the magnetic particles used for the second magnetic layer is 4,000 Oe because if the second magnetic layer is difficult to magnetize when the identification pattern is to be read out, the identification signal cannot be easily read out.

From the foregoing, the feature of the magnetic recording medium according to the present invention resides in localizing magnetic particles under the effect of the magnetic field generated from a signal recorded on the first magnetic layer under the effect of a magnetic orientation filed. Accordingly, it is not necessary for the second magnetic layer 3 to make a direct contact with the first magnetic layer 2 and a non-magnetic intermediate layer may be provided between the first and second layers 2 and 3 so long as the effect aimed at by the present invention is achieved.

Figure 4:
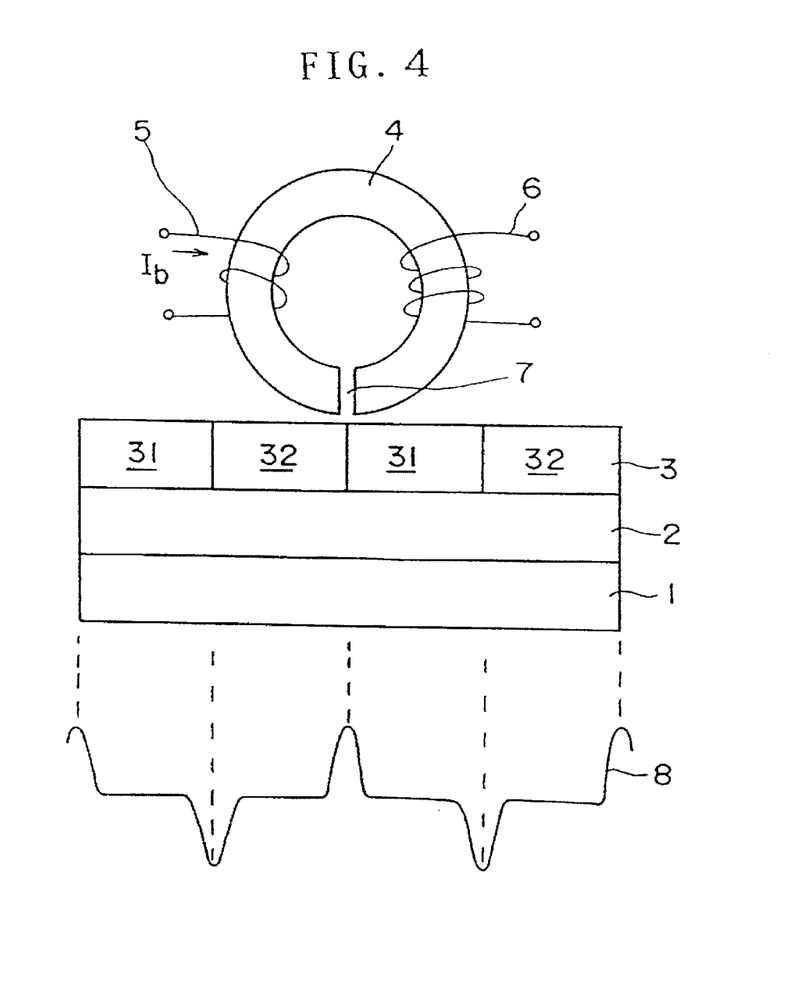
FIG. 4 illustrates the principle of reading of the magnetic recording medium according to the present invention.

In use, the reading of identification signal pattern formed in the magnetic recording medium of the present invention is carried out as follows. First of all, the signal for forming the identification pattern recorded in the first magnetic layer is erased by applying an erasing DC magnetic field to the magnetic recording medium in the areas where the signal is recorded in the first magnetic layer, using a magnetic recording and reproducing apparatus which is capable of recording and reproducing a normal magnetic recording medium. For example, if a DC magnetic field having three times as large a strength as the coercive force of the first magnetic layer is applied, the first magnetic layer is magnetically saturated in one direction to entirely erase the signal for forming the identification pattern. Thereafter, the identification information is read according to the following process. FIG. 4 shows the principle of reading from the magnetic recording medium of the present invention. A read head 4 is provided with a bias coil 5 and a read coil 6. In reading the magnetic recording medium, a predetermined bias current Ib is passed through the bias coil 5 so as to generate a bias magnetic field from the front gap 7 of the magnetic head 4 to relatively scan the areas of the magnetic recording medium where the identification signal is recorded. When the front gap 7 of the magnetic head 4 scans these areas, magnetic resistance of the interfaces between the areas 31 of high magnetic output per unit area and the areas 32 of low magnetic output per unit area is varied and correspondingly the magnetic flux crossing the read coil 6 is also varied, with the result that an output waveform 8 appears across the terminals of the read coil 6 in response to the rate of change of the magnetic flux. In this way, the identification information formed in the predetermined location of the second magnetic layer 3 can be read out.

Incidentally, it is noted that if a flaked magnetic powder of a high permeability such as permalloy, Sendust, amorphous alloy, a soft magnetic material such as iron powder, or a ferrite powder such as Mn—Ni or Ni—Zn ferrite alloy is used in the second magnetic layer, there will remain no remnant magnetization once the identification information has been read according to the above-described saturation method and thus it is impossible to read out the information by eyes, for example, by magnetic development method. Accordingly, this type of magnetic powder is particularly desired.

If a magnetic powder selected from $\gamma$-$Fe_2O_3$, magnetite, cobalt deposited $\gamma$-$Fe_2O_3$, barium ferrite and other magnetic materials conventionally used for magnetic recording is used, the reading is also made possible by the following method. That is, when a DC magnetic field having three times as large a strength as the coercive force of the first magnetic layer 2 is applied, not only the first magnetic layer 2 but also the second magnetic layer 3 are magnetically saturated in one direction. After the erasing DC magnetic field is removed from the zone where the identification pattern is formed in the second magnetic layer 3, the remnant magnetization is larger in the areas of high concentration of magnetic particles than in the areas of low concentration of magnetic particles. In other words, areas of high concentration of magnetic particles and areas of low concentration of magnetic particles correspond to alternation of areas of a strong remnant magnetization and areas of a weak remnant magnetization. By scanning these alternate areas of strong and weak remnant magnetization, an output voltage appears across the terminals of a read-out magnetic head in proportion to the rate of change in magnetic flux in the interface between the strong and weak magnetizations, so that the identification signal can be read from the second magnetic layer 3.

It should be understood that the concentration effect of the magnetic particles in the second magnetic layer by the magnetic orientation field depends on the strength of the magnetic field from the signal recorded in the first magnetic layer and accordingly on the remnant magnetic flux in the first magnetic layer.

Figure 5:
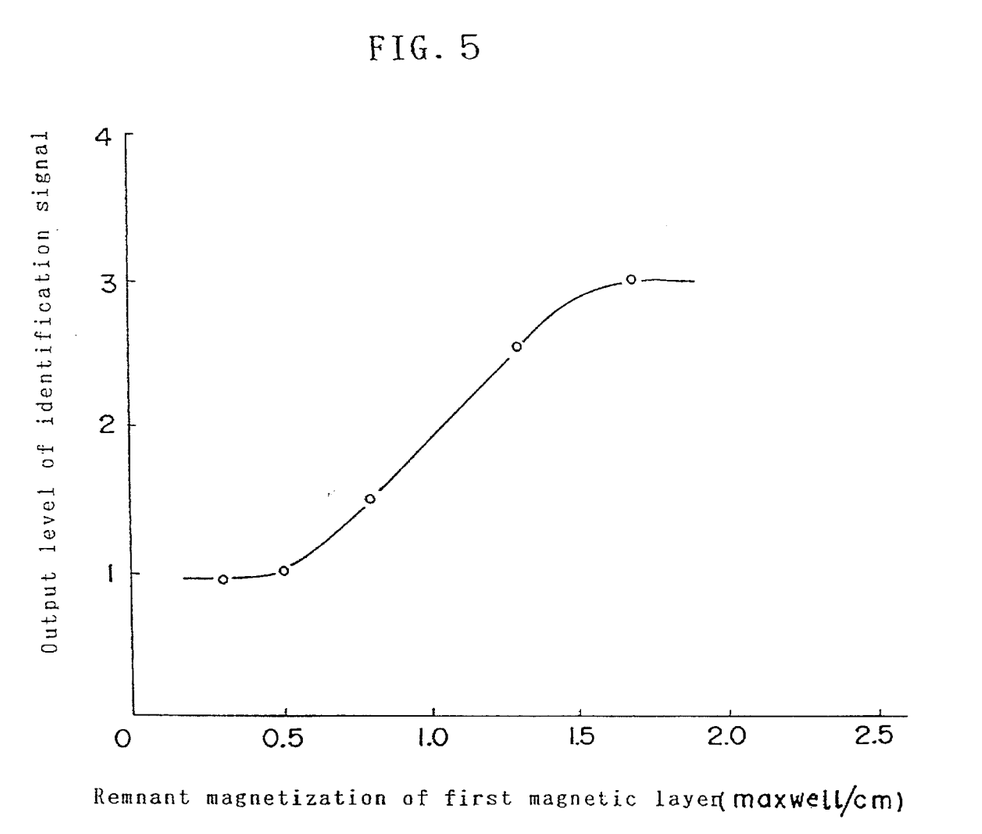
FIG. 5 is a graph showing the relationship between remnant magnetic flux in the first magnetic layer and output level of identifying signal recorded in the second magnetic layer, when the first magnetic layer is formed from a powder of barium ferrite having a coercive force of 2,750 Oe and the second magnetic layer of a thickness of 10 μm is formed from flake-shaped magnetic particles of a high permeability Fe—Si alloy having a coercive force less than 20 Oe.

FIG. 5 shows a relationship between the remnant magnetic flux of the first magnetic layer and the output voltage level when a barium ferrite powder having a coercive force of 2,750 Oe is used for the first magnetic layer and a flaked powder of high permeability Fe—Si alloy having a coercive force of about 20 Oe is used for the second magnetic layer coated on the first magnetic layer in a thickness of about 10

µm. The ordinate is arbitrary measure and represents output voltage level. From FIG. 5, the output level of the identification signal from the second magnetic layer becomes larger when the magnetic field becomes larger, particularly 0.5 Mx/cm or more.

From the principle of the present invention, it is evident that the second magnetic layer on which the identification information signal is recorded may cover the entire surface of the first magnetic layer or only the portion or zone containing the areas where the identification information signal is recorded. In the former case, the zone other than the areas for recordal of the identification signal may be used as a magnetic recording medium comprising two or more stacked layers having different coercive forces as disclosed in the applicant's Japanese Patent Kokai No.63-34727 and accordingly the confidentiality is much more enhanced.

Further, in a magnetic recording medium having three or more magnetic layers, it will be clear that the identification signal may be recorded in any of the layers other than the first-formed magnetic layer.

It should be understood that the magneti recording medium of the present invention is not restricted to the above-mentioned embodiment but may include a colored shield layer, a print layer, a protective layer or the like appropriately provided on the second magnetic layer, and, if desired, may further include printed characters. The magnetic recording medium may also be prepared by first coating a peel layer such as silicone onto a substrate, forming at least first and the second magnetic layers according to the afore-mentioned method and applying an adhesive thereon to produce a transfer tape. Then, the tape is positioned at and transferred to a preselected location of a support made of hard polyvinylchloride or PET.

In the following, preferred examples of producing the magnetic recording medium according to the present invention will be explained.

Figure 6:
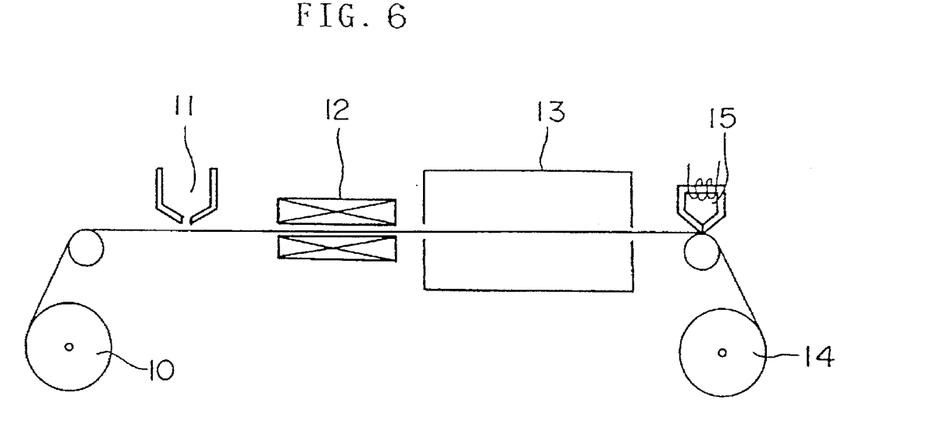
FIG. 6 illustrates one method for manufacturing a magnetic recording medium according to the present invention.

FIG. 6 is a schematic cross sectional view, showing one example of the method according to the present invention.

A first magnetic coating is coated on a non-magnetic support fed from a supply device 10 with a coating head 11, to form a first magnetic layer. The support having the first magnetic coating is passed through a magnetic orientation field generating apparatus 12, and tunnel dryer 13 to produce the first magnetic layer. On the first magnetic layer, a signal for forming an identification information is recorded before the laminate is taken up by a winding device 14.

Next, the roll having the first magnetic layer is fed from the supply device 10 again and is coated with a second magnetic layer with the coating head 11, then fed to the orientation field generation device 13 and finally taken up by the winding device 14.

Figure 7:
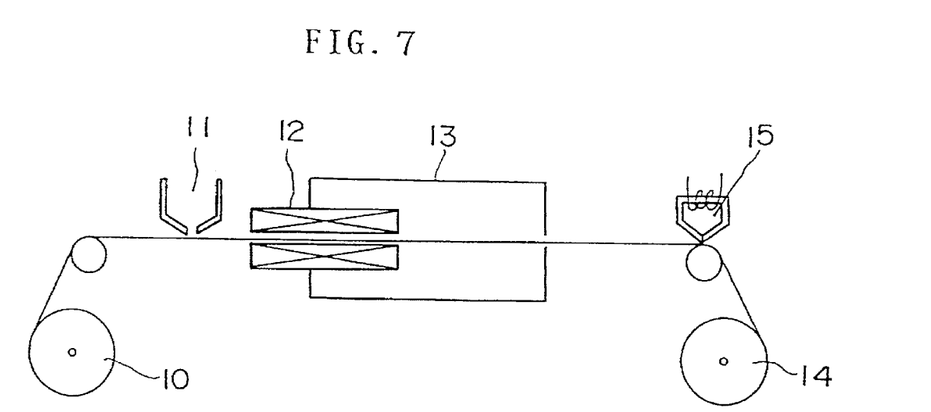
FIG. 7 illustrates another method for manufacturing a magnetic recording medium according to the present invention.

FIG. 7 shows a cross sectional view, showing another example of the method for manufacturing the magnetic recording medium according to the invention. It will be noticed that the system is similar to that in FIG. 6 except that the magnetic orientation field generating device 12 is partly in the tunnel dryer 13.

Figure 12:
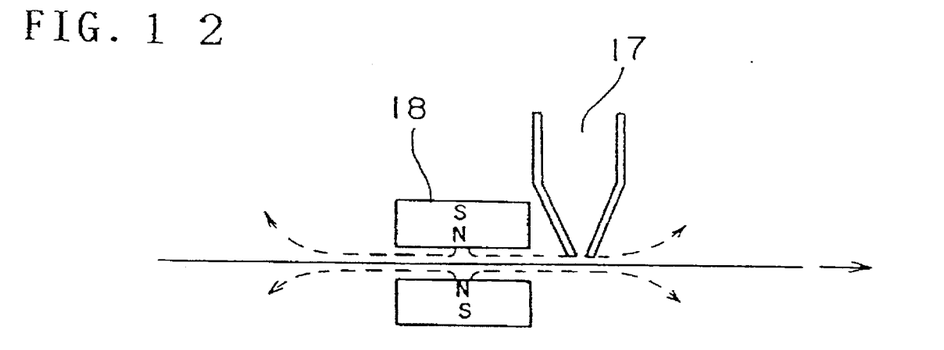
FIG. 12 shows another example of combination of a magnetic orientation device and a coating head which may be used in the present invention.

The magnetic orientation field generating device 12, particularly for the second magnetic layer, may generate an AC magnetic field or a DC magnetic field generated by a pair of permanent magnets with their pole pieces of the same polarity facing each other but it is preferable to use solenoid coils such as those shown in FIGS. 6–7 or permanent magnets 12, 12' as shown in FIG. 12.

Another embodiment of the present invention will now be explained.

Figure 9:
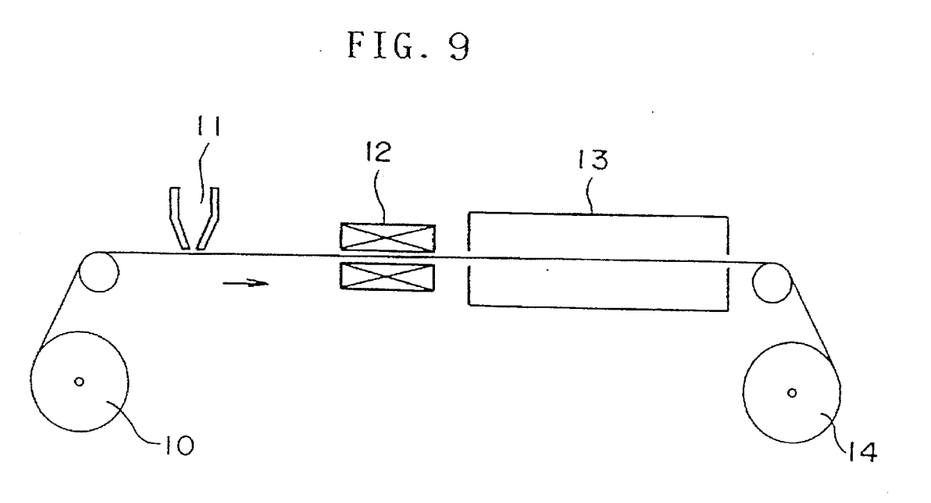
FIG. 9 illustrates a method for applying a first magnetic layer on a non-magnetic support.

FIG. 9 is a schematic cross sectional view showing a process of forming a magnetic a first magnetic layer. A non-magnetic support film is supplied from a supply 10 and is coated with a first magnetic layer 2 with a coating head 11. The coated support is subjected to magnetic orientation in a magnetic orientation device 12, is dried in a dryer 13 and the dried and coated support is taken up by a winding device 14.

Figure 10:
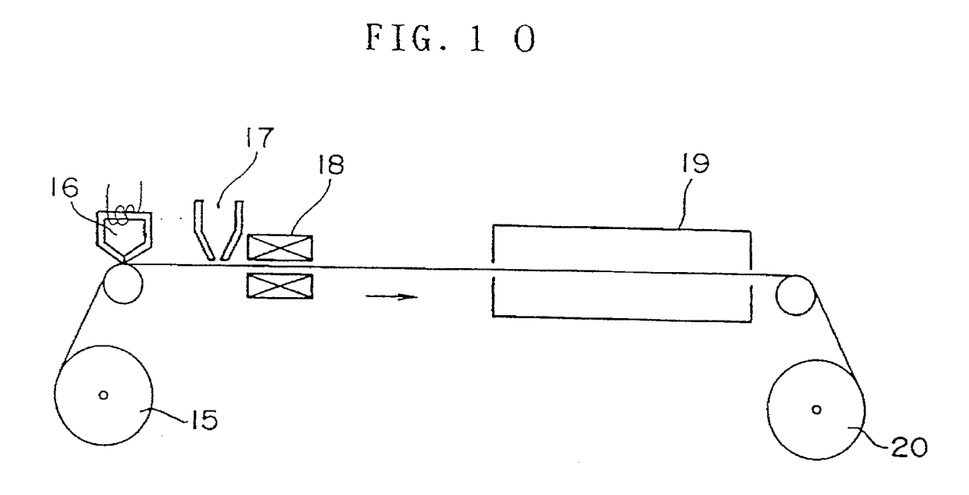
FIG. 10 illustrates a method for applying a second magnetic layer on the first magnetic layer formed by the method shown in FIG. 9.

FIG. 10 is a schematic cross sectional view, showing a process of forming a second magnetic coating on the first magnetic layer. The laminate of the non-magnetic support and the first magnetic layer is fed from a roll or supply device 15, a predetermined signal is recorded on the first magnetic layer with a magnetic head 16. Subsequently, a second magnetic coating is applied to the laminate with a coating head 17 and a magnetic orientation field of at least 10 Oe generated by a first orientation device 18 is applied simultaneously to the second magnetic coating. Thereafter, the coated laminate is advanced through the orientation device 18, then a drier 19 and finally wound into a roll by a take-up device 20. A solenoid coil is used as the first magnetic orientation device 18 as it is desired that the direction of the magnetic field does not vary during the time when the second magnetic coating is advancing through the magnetic field. This solenoid coil is located in close proximity to the down stream outlet of the coating head 17. The coating head should be constructed from a non-magnetic material so as not to disturb the direction and the strength of the magnetic orientation field from the orientation device 18.

Figure 11:
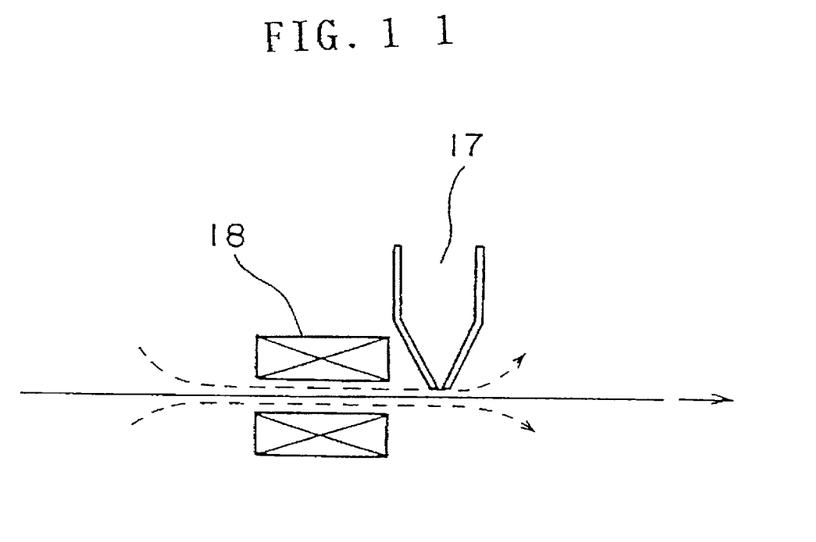
FIG. 11 illustrates an example of combination of a magnetic orientation device and a coating head which may be used in the present invention.

Alternatively, as shown in FIGS. 11 and 12, the orientation solenoid coil or a pair of permanent magnets having opposing pole pieces of the same polarity may be closely located on the upstream inlet side of the coating head 17.

Figure 13:
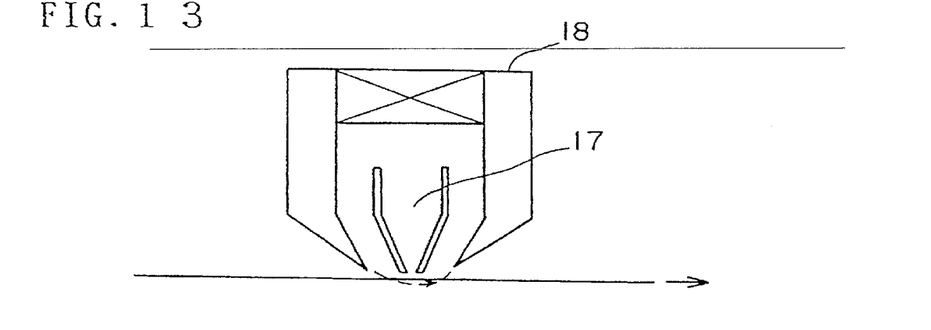
FIG. 13 shows a further example of combination of a magnetic orientation device and a coating head which may be used in the present invention.
Figure 14:
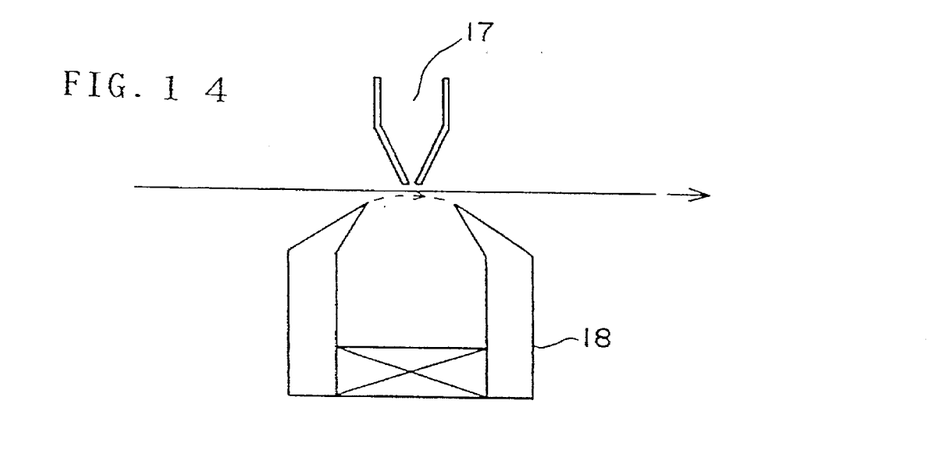
FIG. 14 shows a yet further example of combination of a magnetic orientation device and a coating head which may be used in the present invention.

Further alternative is shown in FIGS. 13 and 14 wherein an electromagnet or permanent magnet having yokes arranged as shown to generate an orientation field in the direction of the coated plane may be used as the orientation device 18 which covers the coating head 17 as shown in FIG. 13 or in a position opposite thereto as shown in FIG. 14.

Incidentally, it should be noted that the magnetic orientation performed during the formation of the first magnetic layer is not essential, though desirable, but may be dispensed with. Also, the recording of the signal for forming identification information may be carried out just prior to application of the second magnetic coating, or after the first magnetic layer is dried but before it is wound up by the take-up device 14. Alternatively, a separate step of recording may be interposed between the processes of forming the first and second magnetic layers.

Figure 8:
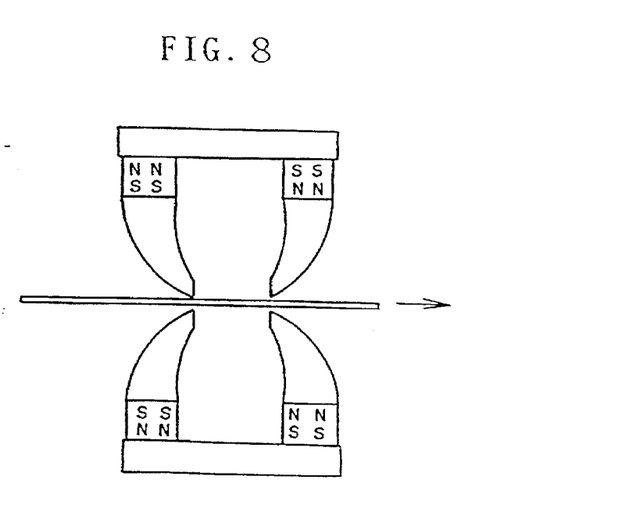
FIG. 8 illustrates an embodiment of a device for generating a DC magnetic orientation field.
Figure 15:
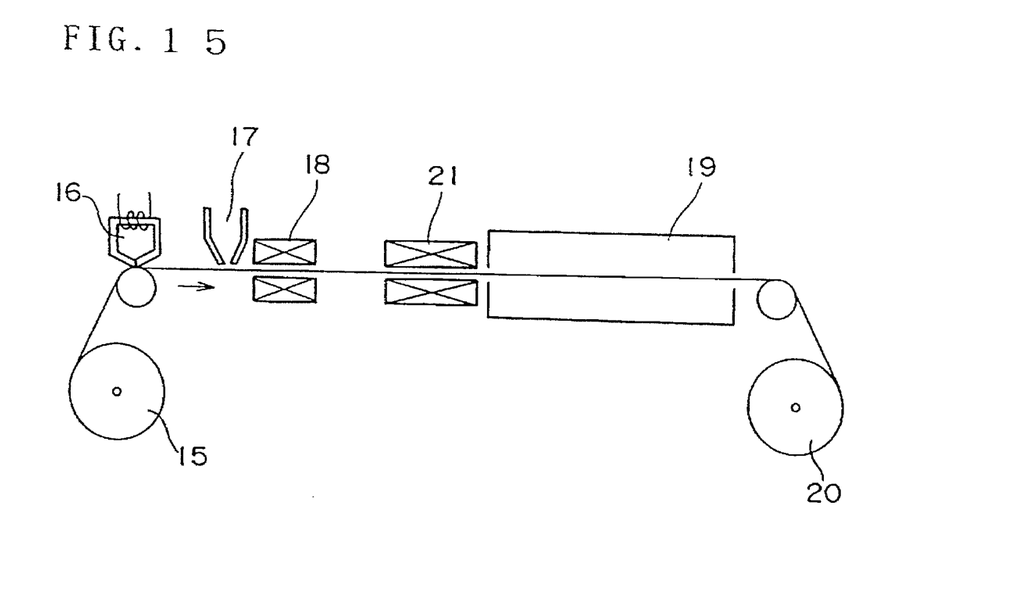
FIG. 15 shows a method of applying a second magnetic coating according to a yet further example according to the present invention.

FIG. 15 is a schematic cross sectional view of a further embodiment of the process of forming a second magnetic layer according to the present invention similar to FIG. 10. The second magnetic coating is applied to the surface of the first magnetic layer formed according to the process shown in FIG. 9 but, unlike the process shown in Fig. 10, a second magnetic orientation device 21 for generating a DC magnetic field of a given strength is located between the first magnetic orientation device 18 and the tunnel dryer 19. The device 21 is desirably a DC solenoid coil or a device similar to that shown in FIG. 8 since it is preferred that the direction of the magnetic field does not vary along the coated surface during passage of the second magnetic coating through the magnetic field. The second orientation device 21 may be located at least partly in the dryer 19.

Figure 16:
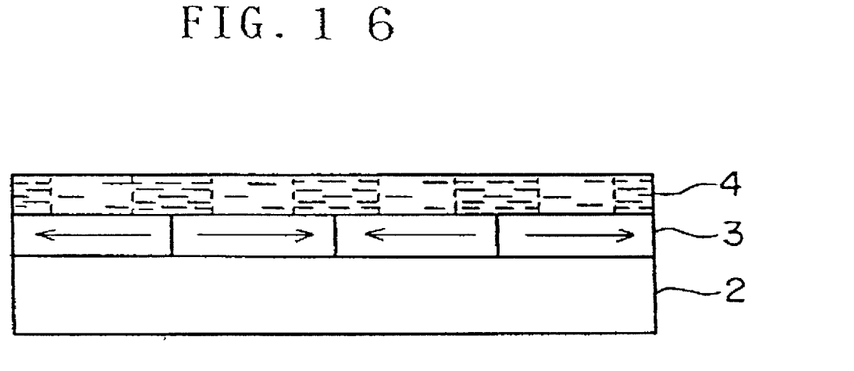
FIG. 16 shows a state after the second magnetic layer has been applied but before the magnetic orientation field is applied.

It is observed that, after the second magnetic coating is applied but before it is subjected to the magnetic orientation field, the magnetic particles of the second magnetic coating tend to be concentrated at the portions where the magnetization recorded on the first magnetic layer is reversed as shown in FIG. 16. Then, the magnetic particles are rearranged under the influence of the magnetic field by way of the precess explained in reference to FIGS. 2A–2C. Then, with lapse of time, the solvent in the second magnetic layer is evaporated and the movement of the magnetic particles becomes so obstructed to obtain the concentrated condition FIG. 2C. Accordingly, it is necessary to apply the magnetic orientation filed as soon as the second magnetic coating is applied and accordingly it is particularly desirable to apply the orientation field simultaneously with the application of the second magnetic coating. Magnetic field of about tens to several hundreds oersted is sufficient to attain the localized concentration of the magnetic particles. If, however, the second magnetic layer is used as a magnetic shield in addition to the use as a non-rewritable recording layer, a stronger magnetic orientation field will be required. In that case, a second magnetic orientation device is arranged between the coating head and the dryer to apply a substantially unidirectional DC magnetic field. The direction of the magnetic field should be in the same direction as that applied by the first magnetic orientation field.

The present invention will now be explained in making reference to working examples and comparative examples.

EXAMPLE 1

A magnetic coating prepared by uniformly mixing a barium ferrite powder having a coercive force of 2,750 Oe with a binder resin, a dispersant, a curing agent, other additives and a solvent to form a dispersion was applied onto one surface of a white polyester film support of a thickness of 188 μm with a gravure coating method. A first magnetic layer having a dry thickness of 12 μm and a remnant magnetization of 1.6 Mx/cm was obtained. Using a normal magnetic recording and reproducing recorder, continuous signals of recording densities of 25FCI and 400FCI and a FM modulation signal of 105BPI were recorded with a given strength on specific areas on the first magnetic layer.

On this recorded first magnetic layer, a second magnetic coating prepared by uniformly mixing a flaked Fe—Si alloy powder having a coercive force of about 20 Oe with a binder resin, a dispersant, a curing agent, other additives and a solvent to form a dispersion was applied using a knife coating method and then subjected to a DC magnetic orientation field of approximately 200 Oe generated by a DC solenoid coil. The second magnetic coating was dried in a dryer. A second magnetic layer having a dry thickness of 12 μm was obtained.

EXAMPLE 2

On the first magnetic layer prepared according to the process shown in Example 1, a second magnetic coating prepared by uniformly mixing a carbonyl iron powder having a particle size less than 5 μm with a binder resin, a dispersant, a curing agent, other additives and a solvent to form a dispersion was applied using a silk screen printing method and then subjected to a DC magnetic orientation field of approximately 200 Oe generated by a DC solenoid coil prior to drying. A second magnetic layer having a dry thickness of 7 μm was obtained.

EXAMPLE 3

On the first magnetic layer prepared according to the process shown in Example 1, a second magnetic coating prepared according to the method in Example 2 was applied according to the same method and then subjected to a AC magnetic orientation field of approximately 400 Oe(O-p) generated by an AC solenoid coil prior to drying. A second magnetic layer having a dry thickness of 7 μm was obtained.

EXAMPLE 4

On the first magnetic layer prepared according to the process shown in Example 1, a second magnetic coating prepared by uniformly mixing a γ-$Fe_2O_3$ powder having a coercive force of about 300 Oe with a binder resin, a dispersant, a curing agent, other additives and a solvent to form a dispersion was applied using a gravure method and then subjected to a DC magnetic orientation field of approximately 800 Oe generated by a DC solenoid coil prior to drying. A second magnetic layer having a dry thickness of 10 μm was obtained.

EXAMPLE 5

On the first magnetic layer prepared according to the process shown in Example 1, a second magnetic coating prepared by uniformly mixing a Co-deposited γ-$Fe_2O_3$ powder having a coercive force of about 650 Oe with a binder resin, a dispersant, a curing agent, other additives and a solvent to form a dispersion was applied using a gravure method and then subjected to a DC magnetic orientation field of approximately 1,200 Oe generated by a DC solenoid coil prior to drying. A second magnetic layer having a dry thickness of 10 μm was obtained.

EXAMPLE 6

On the first magnetic layer prepared according to the process shown in Example 1, a second magnetic coating prepared by uniformly mixing a barium ferrite powder having a coercive force of about 1,000 Oe with a binder resin, a dispersant, a curing agent, other additives and a solvent to form a dispersion was applied using a gravure method and then subjected to a DC magnetic orientation field of approximately 1,200 Oe generated by a DC solenoid coil prior to drying. A second magnetic layer having a dry thickness of 8 μm was obtained.

EXAMPLE 7

On the first magnetic layer prepared according to the process shown in Example 1, a second magnetic coating prepared according to the process in Example 1 was applied by the same method and then subjected to a DC magnetic orientation field of approximately 1,500 Oe generated by a DC solenoid coil prior to drying. A second magnetic layer having a dry thickness of 6 μm was obtained.

Comparative Example 1

On the first magnetic layer prepared according to the process shown in Example 1, a second magnetic coating prepared according to the process in Example 4 was applied without any magnetic orientation.

A second magnetic layer having a dry thickness of 10 μm was obtained.

Comparative Example 2

On the first magnetic layer prepared according to the process shown in Example 1, a second magnetic coating prepared by uniformly mixing a strontium ferrite powder having a coercive force of about 7,000 Oe with a binder resin, a dispersant, a curing agent, other additives and a solvent to form a dispersion was applied using a gravure method and then subjected to a DC magnetic orientation field of approximately 1,500 Oe generated by a DC solenoid coil prior to drying. A second magnetic layer having a dry thickness of 6 μm was obtained.

Comparative Example 3

On the first magnetic layer prepared according to the process shown in Example 1, a second magnetic coating prepared by uniformly mixing a barium ferrite powder having a coercive force of about 4,500 Oe with a binder resin, a dispersant, a curing agent, other additives and a solvent to form a dispersion was applied using a gravure method and then subjected to a DC magnetic orientation field of approximately 1,500 Oe generated by a DC solenoid coil prior to drying. A second magnetic layer having a dry thickness of 6 μm was obtained.

Magnetic cards of a size of 86 mm ×54 mm were obtained by punching out the magnetic sheets prepared in Examples 1–7 and Comparative Examples 1–3.

The magnetic cards were read according to the following procedure. The signal recorded in the first magnetic layer of these magnetic cards were first DC erased by a reader/writer provided with a magnetic head which is capable of saturation-writing on a magnetic layer having a coercive force of 2,750 Oe. Then, while a current was being supplied to the bias coil of a read-out magnetic head mounted on the reader/writer to generate a magnetic field of about 800 Oe from the front gap of the head, output voltage(peak-to-peak) was read from each of the magnetic cards. The reproduced output levels for continuous signals of 25FCI and 400 FCI and the result of detection of modulated signal of 105BPI for each magnetic card are listed in Table 1. The outputs for 25FCI and 400FCI are also expressed in terms of relative values based on the output(100%) obtained by first subjecting the first magnetic layer of Example 4 to saturation writing at 210FCI and then reading the output.

In all Examples 1–7, more than 20% outputs were obtained for signals of 25FCI and 400FCI based on the signal recorded on the first magnetic layer and the modulated signal of 105BPI had a good S/N ratio and could be easily detected without problem. Further, Examples 2, 3, 4 and Comparative Example 1 proves that the magnetic orientation applied prior to completion of drying of the second magnetic coating is effective. On the other hand, the use of magnetic particles having excessively high coercive force led to very low outputs and made detection impossible even if magnetic orientation was effected as is evident from Comparative Examples 2 and 3. In the table, ○ indicates that detection was possible without problem and × indicates that detection was not possible.

TABLE 1

|  | 25 FCI Output | 400 FCI Output | Detection |
| --- | --- | --- | --- |
| Ex. 1 | 60% (2.89 V) | 55% (2.65 V) | ○ |
| Ex. 2 | 120% (5.78 V) | 70% (3.37 V) | ○ |
| Ex. 3 | 78% (3.76 V) | 64% (3.08 V) | ○ |
| Ex. 4 | 30% (1.45 V) | 32% (1.54 V) | ○ |
| Ex. 5 | 27% (1.30 V) | 30% (1.45 V) | ○ |
| Ex. 6 | 25% (1.21 V) | 26% (1.25 V) | ○ |
| Ex. 7 | 22% (1.06 V) | 24% (1.16 V) | ○ |
| Comp. Ex 2 | 4% (0.19 V) | 3% (0.14 V) | × |

TABLE 1-continued

|  | 25 FCI Output | 400 FCI Output | Detection |
| --- | --- | --- | --- |
| Comp. Ex 3 | 4% (0.19 V) | 5% (0.24 V) | × |
| Comp. Ex 4 | 7% (0.34 V) | 8% (0.31 V) | × |

EXAMPLE 8

A magnetic coating prepared by uniformly mixing a barium ferrite powder having a coercive force of 2,750 Oe with a binder resin, a dispersant, a curing agent, other additives and a solvent to form a dispersion was applied onto one surface of a white polyester film support of a thickness of 188 μm with a gravure coating method. A first magnetic layer having a dry thickness of 8 μm was obtained. Continuous signals of recording densities of 25FCI and 400FCI and a FM modulated signal of 105BPI were saturation recorded on specific areas on the first magnetic layer.

On this recorded first magnetic layer, a second magnetic coating prepared by uniformly mixing a flaked Fe—Si alloy powder having a coercive force of about 20 Oe with a binder resin, a dispersant, a curing agent, other additives and a solvent to form a dispersion was applied using a knife coating method. Right after the coating, a DC magnetic orientation field having a maximum strength of approximately 600 Oe generated by a DC solenoid coil was applied to the second magnetic coating. Thereafter, the magnetic coating was dried in a dryer. A second magnetic layer having a dry thickness of 10 μm was obtained.

EXAMPLE 9

Example 8 was repeated except that the solenoid coil for applying the magnetic orientation field to the second magnetic coating was so arranged that it was partly located in the dryer.

EXAMPLE 10

On the first magnetic layer prepared according to the process shown in Example 8, a second magnetic coating prepared by uniformly mixing a γ-$Fe_2O_3$ powder having a coercive force of about 300 Oe with a binder resin, a dispersant, a curing agent, other additives and a solvent to form a dispersion was applied using a gravure method and, immediately subsequent to the application of the coating, was subjected to a DC magnetic orientation field of approximately 1,000 Oe generated by a DC solenoid coil prior to drying. A second magnetic layer having a dry thickness of 8 μm was obtained.

EXAMPLE 11

Example 10 was repeated except that the solenoid coil for applying the magnetic orientation field to the second magnetic coating was so arranged that it was partly located in the dryer.

EXAMPLE 12

Example 10 was repeated except that a magnetic orientation field having the maximum strength of about 1,000 Oe was applied by a pair of permanent magnets having pole pieces of the same polarity facing each other.

Cards were prepared from the magnetic sheets prepared in Examples 8–11. The test results are listed in Table 2. In this table, Δ indicates that detection was possible although the output level was relatively low.

TABLE 2

|  | 25 FCI Output | 400 FCI Output | Detection |
| --- | --- | --- | --- |
| Ex. 8 | 68% (3.28 V) | 54% (2.60 V) | ○ |
| Ex. 9 | 83% (4.00 V) | 69% (3.22 V) | ○ |
| Ex. 10 | 31% (1.50 V) | 27% (1.32 V) | ○ |
| Ex. 11 | 38% (1.85 V) | 34% (1.64 V) | ○ |
| Ex. 12 | 13% (0.62 V) | 23% (1.10 V) | Δ |

The cards of Examples yielded outputs for signals of 25FCI and 400FCI with sufficient levels and the modulated signal of 105BPI had good S/N and was detected without any problem. These examples show that application of a magnetic orientation field to the second magnetic coating prior to drying of the second magnetic coating gives a superior result. Further, comparison of Examples 8–11 with Example 12 shows that a superior result is obtained by applying DC magnetic field from a DC solenoid coil and effectiveness of additional magnetic orientation in the dryer is also obtained.

EXAMPLE 13

A magnetic coating prepared by uniformly mixing a barium ferrite powder having a coercive force of 2,750 Oe with a binder resin, a dispersant, a curing agent, other additives and a solvent to form a dispersion was applied onto one surface of a white polyester film support of a thickness of 188 μm with a gravure coating method. A first magnetic layer having a dry thickness of 8 μm was obtained. Continuous signals of recording densities of 25FCI and 400FCI and a FM modulated signal of 105BPI were saturation-recorded respectively on specific areas on the first magnetic layer.

On this recorded first magnetic layer, a second magnetic coating prepared by uniformly mixing a carbonyl iron powder having an average particle size of 1.5 μm with a binder resin, a dispersant, a curing agent, other additives and a solvent to form a dispersion was applied using a gravure coating method. Simultaneously, a DC magnetic orientation field having a strength of approximately 50 Oe at the coating head was applied to the second magnetic coating from a DC solenoid coil placed very close to the coating head. Thereafter, the magnetic coating was dried in a dryer. A second magnetic layer having a dry thickness of 5 μm was obtained.

EXAMPLE 14

On the first magnetic layer prepared according to the process shown in Example 13, signals were recorded according the procedure described in Example 13. On the first magnetic layer thusly recorded, a second magnetic coating prepared by uniformly mixing a flaked Fe—Si alloy powder having a coercive force of about 20 Oe and an average particle size of 12 μm with a binder resin, a dispersant, a curing agent, other additives and a solvent to form a dispersion was applied using a knife coating method. Simultaneously, a DC magnetic orientation field having a strength of approximately 30 Oe at the coating head was applied to the second magnetic coating from a DC solenoid coil placed very close to the downstream outlet of the coating head. After the coating, a magnetic orientation field of about 600 Oe was applied using a second DC magnetic orientation device. Thereafter, the magnetic coating was dried in a dryer. A second magnetic layer having a dry thickness of 10 μm was obtained.

EXAMPLE 15

On the first magnetic layer prepared according to the process shown in Example 13, signals were recorded according the procedure described in Example 13. On the first magnetic layer thusly recorded, a second magnetic coating prepared by uniformly mixing a γ-Fe$_2$O$_3$ powder having a coercive force of about 300 Oe with a binder resin, a dispersant, a curing agent, other additives and a solvent to form a dispersion was applied using a gravure coating method. Simultaneously, a DC magnetic orientation field having a strength of approximately 100 Oe at the coating head was applied to the second magnetic coating from a DC solenoid coil placed very close to the upstream side of the coating head. Subsequently, a second magnetic orientation field having a maximum field of 1,500 Oe was applied from a second DC solenoid coil positioned upstream of a dryer and then the second magnetic coating was dried in the dryer. A second magnetic layer having a dry thickness of 8 μm was obtained.

EXAMPLE 16

Example 14 was repeated except that the orientation field generation device was moved to a position right upstream of the dryer so that the orientation field was not applied to the coating head position.

Cards were prepared from the magnetic sheets prepared in Examples 13–16. The test results show that sufficient outputs were obtained for the signals of 25FCI and 400FCI and the modulated signal of 105BPI had a good S/N and was detected in each card. However, the card of Example 16 only gave lower outputs than the other examples and the reproduction wave of the FM signal of 105BPM contained more noise than the cards of the other examples.

From these facts, it was confirmed that the application of a DC orientation field to the position of application of the second magnetic coating is more effective.

From the foregoing, it is understood that the magnetic recording medium including one of at least two magnetic layers can carry a non-rewritable permanent signal pattern which has been recorded by the magnetic field generated by a signal recorded on the other magnetic layer or layers. By using this pattern as a means for identifying the magnetic recording medium, this pattern cannot be erased by any recording medium handling devices except for destruction of the recording medium and accordingly a recording medium of extremely high security against forgery or modification has been provided.

Moreover, the present method is characterized in that the magnetic recording medium can be manufactured without requiring any special materials or process, in comparison with the conventional methods which require printing of magnetic bar codes, optical bar codes or other fixed signals. The followings are above-mentioned or other features of the present invention.

(1) The means for identifying the magnetic recording medium is incorporated into the medium when the medium is manufactured, utilizing a magnetic orientation. Accordingly, there is no means of erasing and re-writing the means for identification, whereby a magnetic recording medium of high confidentiality or security can be provided.

(2). The means for identification cannot be confirmed by eyes from outside and even if the surface layer is removed by, for example, sand paper the means for identification cannot been seen.

(3) The production cost is low since any special materials or facilities are not required.

(4) The means or signal pattern of identification has a much higher density than the conventional water mark or magnetic bar codes because the pattern is formed by magnetic recording.

It will be evident for those skilled in the art that the present invention can be embodied in various other forms without departing from the present invention.

What we claim is:

1. A magnetic recording medium including a non-magnetic support and at least two magnetic layers formed on said support, characterized in that said at least two magnetic layers includes a first magnetic layer on said support and a second magnetic layer above said first magnetic layer containing magnetic particles having a coercive force of 4,000 Oe or less dispersed in a binder and has a non-rewritable fixed signal which has been recorded by a magnetic field generated by a signal recorded on said first magnetic layer under the influence of an orientation magnetic field having a magnetic field strength lower than the coercive force of said first magnetic layer but strong enough to cause the movement of said magnetic particles.

2. A magnetic recording medium according to claim 1, wherein said non-rewritable fixed signal recorded on said second magnetic layer is formed by specific areas and other areas adjacent to said specific areas, said specific areas have a different magnetic output per unit area from said other areas.

3. A magnetic recording medium according to claim 2, wherein said non-rewritable fixed signal recorded on said at least one magnetic layer is an information for identifying the magnetic recording medium.

4. A magnetic recording medium according to claim 1, wherein said non-rewritable fixed signal recorded on said second magnetic layer is formed by specific areas and other areas adjacent to said specific areas, said specific areas have a different number of magnetic particles per unit volume from said other areas.

5. A magnetic recording medium according to claim 4, wherein said non-rewritable fixed signal recorded on said at least one magnetic layer is an information for identifying the magnetic recording medium.

6. A magnetic recording medium according to claim 1, wherein said non-rewritable fixed signal recorded on said second magnetic layer is an information for identifying the magnetic recording medium.

7. A method for manufacturing a magnetic recording medium including a non-magnetic support and at least two magnetic layers formed on said support, which comprises the steps of forming a first magnetic layer on said non-magnetic support;

magnetically recording a specific signal on said first magnetic layer;

applying a magnetic coating on a surface of said first magnetic layer to form a second magnetic layer which contains magnetic particles having a coercive force of 4,000 Oe or less dispersed in a binder;

applying a magnetic orientation field having a field strength lower than the coercive force of said first magnetic layer but strong enough to cause the movement of said magnetic particles to said magnetic coating prior to completion of drying and solidification of said magnetic coating;

and performing said drying and solidifying of said magnetic coating to form said second magnetic layer which has a non-rewritable fixed signal which has been recorded by the magnetic field generated by said signal recorded on said first magnetic layer under the influence of said magnetic orientation field.

8. A method for manufacturing a magnetic recording medium according to claim 7, wherein said magnetic orientation field applied to the magnetic coating for the second magnetic layer prior to the drying and solidification of said magnetic coating is substantially uniform along the surface of said first magnetic layer.

9. A method for manufacturing a magnetic recording medium according to claim 8, wherein said magnetic orientation field is generated by magnetic orientation means, said drying and solidification were effected by drying means, and at least a part of said magnetic orientation means is located in said drying means.

10. A method for manufacturing a magnetic recording medium according to claim 7, wherein said magnetic orientation field is generated by magnetic orientation means, said drying and solidification were effected by drying means, and at least a part of said magnetic orientation means is located in said drying means.

11. A method for manufacturing a magnetic recording medium according to claim 8, wherein said magnetic orientation field is generated by magnetic orientation means including a solenoid coil.

12. A method for manufacturing a magnetic recording medium according to claim 10, wherein said magnetic orientation field is generated by magnetic orientation means including a solenoid coil.

13. A method for manufacturing a recording medium including a non-magnetic support and at least two magnetic layers formed on said support, which comprises the steps of forming a first magnetic layer on said non-magnetic support;

magnetically recording a specific signal to said first magnetic layer;

applying a magnetic coating on a surface of said first magnetic layer to form a second magnetic layer contains magnetic particles having a coercive force of 4,000 Oe or less dispersed in a binder;

applying a DC magnetic orientation field having a field strength lower than the coercive force of said first magnetic layer to said magnetic coating simultaneously with application of said magnetic coating on the surface of said first magnetic layer;

and thereafter drying and solidifying said magnetic coating to form said second magnetic layer which has a non-rewritable fixed signal which has been recorded by the magnetic field generated by said signal recorded on said first magnetic layer under the influence of said magnetic orientation field.

14. A method for manufacturing a magnetic recording medium according to claim 13, wherein said DC magnetic orientation field applied to the magnetic coating for the second magnetic layer simultaneously with the application of said magnetic coating is substantially uniform along the surface of said first magnetic layer.

15. A method for manufacturing a magnetic recording medium according to claim 14, wherein said method further comprises a step of applying a second DC magnetic orientation field after the application of said magnetic coating but prior to completion of said drying and solidification.

16. A method for manufacturing a magnetic recording medium according to claim 14, wherein said DC magnetic orientation field is generated by a DC solenoid coil.

17. A method for manufacturing a magnetic recording medium according to claim 16, wherein said method further comprises a step of applying a second DC magnetic orientation field after the application of said magnetic coating but prior to completion of said drying and solidification.

18. A method for manufacturing a magnetic recording medium according to claim 13, wherein said method further comprises a step of applying a second DC magnetic orientation field after the application of said magnetic coating but prior to completion of said drying and solidification.

19. A method for manufacturing a magnetic recording medium according to claim 19, wherein said second DC magnetic orientation means is substantially uniform along the surface of the first magnetic layer.

20. A method for manufacturing a magnetic recording medium according to claim 18, wherein said second DC magnetic orientation means is generated by a DC solenoid coil.

* * * * *